Dec. 26, 1933. J. A. MARTIN 1,940,721
BOTTLE CAP SEALING DEVICE
Filed May 22, 1931

Inventor,
John A. Martin
By Minturn & Minturn
Attorneys.

Patented Dec. 26, 1933 1,940,721

UNITED STATES PATENT OFFICE 1,940,721

BOTTLE CAP SEALING DEVICE

John A. Martin, Indianapolis, Ind.

Application May 22, 1931. Serial No. 539,296

6 Claims. (Cl. 215—78)

The object of this invention is to provide an inexpensive cap for bottles containing beverages like cider, other fruit juices, ginger ale, root beer and the like, which cap will have means for the introduction of carbonated gases into the bottled beverage, under pressure, to give life, sparkle and vitality to the beverage when it is poured out for consumption, and for retaining indefinitely the carbonated condition of the bottled beverage.

I accomplish the above and other objects which will hereinafter appear, by the means illustrated in the accompanying drawing, in which—

Like characters of reference indicate like parts in the several views.

Figure 1:
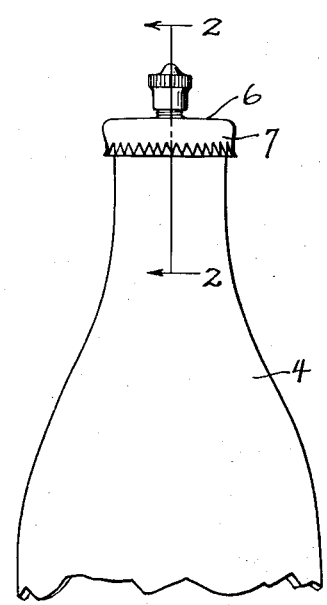
Fig. 1 shows the upper end of a bottle in side elevation with my invention applied.

The bottle 4 is of any usual or convenient form and size with a neck having an outside bead 5. A sheet metal cap including a disc 6 with a downturned flange 7, is adapted to fit over the neck outlet and the flange crimped under the bead 5 in the usual manner of such closures.

The disc 6 has a flat-bottomed circular central depression formed by diepressure in the manufacture of the disc, and it has a small hole 8 at the center of the depression.

An externally threaded short tube 9 is secured with an airtight fit, by soldering or other means in the depression. The bore of the tube is contracted toward the outer end of the tube thereby forming a seat for a ball valve 10, assembled within the tube, upon a spring 11. The spring normally raises the ball into said seat. The ball makes a sufficiently loose fit in the major bore of the tube to allow gas under pressure to pass the ball when the ball is forced down out of its seat.

A cap 12 has an internal thread by which the cap is screwed upon the tube 9, and the inner interior of the cap has a packing 13 making a gastight joint between the cap and outer end of the tube.

Seated within the cap, against the disc 6, is a comparatively thick circular rubber disc seal 14, which has a series of small perforations 15, here shown as four in number, arranged in a circle around the center of the disc seal 14, but sufficiently remote from the center to leave ample solid rubber between them to seal the hole 8 in the disc 6 against outward pressure from within the bottle.

A disc of rubber 16, here shown as much thinner than the rubber disc seal 14, contacts the inner side of the disc 16. It has a circular concentric series of very small perforations 17, in a circle of much greater radius than the circle in which the perforations 15 are formed.

Figure 4:
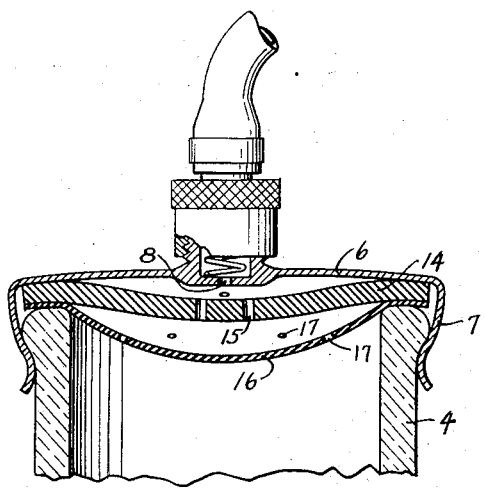
Fig. 4 is a view similar to Fig. 2 showing the action of pressure on the parts in the carbonating operation.

In the operation of my device as shown in Fig. 4, the cap 12 is removed and the tube 9 connected with a pump supplying carbonic acid gas ($CO_2$) or with a tank containing that gas under sufficient pressure. The gas thus supplied under pressure, pushes the ball valve 10 down out of its seat and passing through the hole 8, separates the disc 14 from the disc 6. It then passes through the perforations 15 into contact with the rubber disc 16 and stretching the latter away from the disc 14 discharges into the bottle through the small perforations 17. As the rubber stretches the perforations are correspondingly enlarged by stretching until the gas passes through without further increasing the strain on the rubber to dangerously stretch it.

Figure 2:
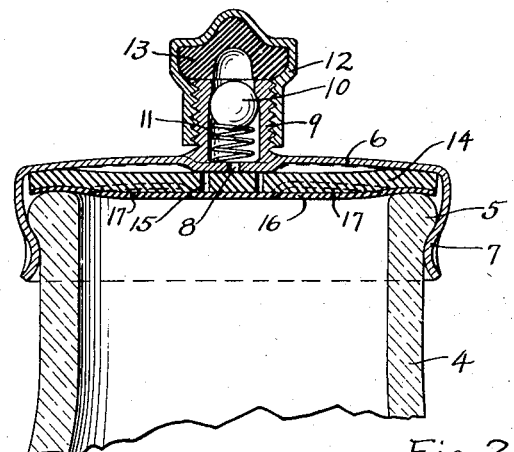
Fig. 2 is a vertical section on the line 2—2, on a larger scale.
Figure 3:
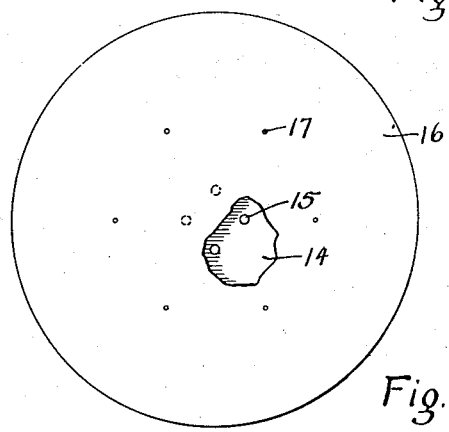
Fig. 3 is an underside plan view of the packing disc shown in section in Fig. 2, removed from the cap and broken away in part.

After the bottle is sufficiently charged the pressure of the gas contained in it forces the disc 16 tightly against the disc 14 and forces both of them toward the metal disc 6, with the disc 14 tight against disc 6 to the position of the two rubber discs as shown by dotted lines in Fig. 2, which stretches both rubbers tightly against the circular depression at the center of disc 6, closing the openings 15, 17 and 18 effectively against the escape of the gas. In fact the thin rubber of disc 16 is forced by the gas pressure into the holes 17, like plugs, to close the holes. The ball valve 10 is also seated by its spring 11, as an additional precaution.

However, the escape of gas from the bottle is so effectively prevented by closures made by the rubber discs 14 and 16 that the ball valve 10 may be omitted, as also may the tube 9 and cap 12, the pump or storage tank supply tube being then provided with some other well known and suitable cap connections, not shown.

Having thus fully described my invention and the best embodiment thereof now known to me, what I claim as new and wish to secure by Letters Patent, is—

1. In a closure for bottles, a cap having a metal disc with a hole therethrough, a disc seal of yielding material adapted to contact the inner side of the metal disc and having one or more perforations out of alinement with the perforation in the cap disc, and a second seal of yielding material much thinner and more elastic than the disc seal contacting the disc seal and having one or more perforations out of alinenent with the perforation or perforations in the disc seal.

2. In a closure for bottles, a cap having a metal disc with an annular central depression and a hole in the bottom of the depression, a disc seal of rubber adapted to contact the inner side of the metal disc and having one or more perforations out of alinement with the hole in the cap disc, and a second seal of thinner rubber contacting the disc seal and having one or more perforations out of alinement with the perforation or perforations in the disc seal.

3. In a closure for bottles, a cap having a metal disc with an annular central depression and a hole at the center of the depression, a disc seal of rubber adapted to contact the inner side of the metal disc and to be stretched across the depression and having a plurality of perforations remote from the hole in the cap disc, and a second seal of thinner rubber contacting the disc seal and having a plurality of perforations remote from the perforations in the disc seal.

4. In a closure for bottles, a cap having a metal disc with an annular central depression and a hole in the depression, an externally threaded tube in the depression, a ball valve seated in the tube, a removable tube cap, a disc seal of rubber adapted to contact the inner side of the metal disc and to be stretched across the depression and having a plurality of perforations remote from the hole in the cap disc.

5. In a closure for bottles, a cap having a metal disc with an annular central depression and a hole in the depression, an externally threaded tube in the depression, a ball valve seated in the tube, a removable tube cap, a disc seal of rubber adapted to contact the inner side of the metal disc and to be stretched across the depression and having a plurality of perforations remote from the hole in the cap disc, and a second seal of thinner rubber contacting the disc seal and having a plurality of perforations remote from the perforations in the disc seal.

6. In a closure for bottles, a cap having a metal disc with a hole therethrough, a disc seal of rubber held between the cap and bottle and adapted to contact the inner side of the metal disc and having one or more perforations out of alignment with the hole in the cap disc and a second disc thinner and more elastic than the disc seal held between the disc seal and the bottle and having more and much smaller perforations than the disc seal out of alignment with the perforations of the disc seal.

JOHN A. MARTIN.